United States Patent
Faulkner

(10) Patent No.: US 10,948,380 B2
(45) Date of Patent: Mar. 16, 2021

(54) COMPOSITE PIPE ASSEMBLY

(71) Applicant: Crompton Technology Group Limited, Solihull (GB)

(72) Inventor: Dale Faulkner, Stourbridge (GB)

(73) Assignee: CROMPTON TECHNOLOGY GROUP LIMITED, Solihull (GB)

( * ) Notice: Subject to any disclaimer, the term of this patent is extended or adjusted under 35 U.S.C. 154(b) by 0 days.

(21) Appl. No.: 16/361,697

(22) Filed: Mar. 22, 2019

(65) Prior Publication Data

US 2019/0391036 A1 Dec. 26, 2019

(30) Foreign Application Priority Data

Jun. 22, 2018 (EP) .................................... 18275088

(51) Int. Cl.
*F16L 57/00* (2006.01)
*G01M 3/38* (2006.01)
*F16L 55/00* (2006.01)

(52) U.S. Cl.
CPC ............... *G01M 3/38* (2013.01); *F16L 55/00* (2013.01)

(58) Field of Classification Search
CPC ......... F16L 33/01; F16L 39/02; F16L 39/005; F16L 11/20; F16L 2201/30; F16L 57/00
USPC ........ 138/104, 109, 114, 148; 285/97, 123.1
See application file for complete search history.

(56) References Cited

U.S. PATENT DOCUMENTS

| | | | |
|---|---|---|---|
| 4,925,218 A | 5/1990 | Kunz et al. | |
| 5,054,523 A | 10/1991 | Rink | |
| 5,203,378 A * | 4/1993 | Williams | F16L 11/20 138/104 |
| 5,353,843 A * | 10/1994 | Hoag | F16L 11/12 138/103 |
| 5,829,483 A * | 11/1998 | Tukahara | F16L 9/18 138/109 |
| 6,446,661 B2 * | 9/2002 | Armenia | F16L 11/20 137/312 |
| 8,544,503 B2 * | 10/2013 | Barber | B64D 37/32 138/110 |
| 9,638,241 B2 | 5/2017 | Gallant et al. | |
| 9,791,074 B2 * | 10/2017 | Hoglund | B01J 8/067 |
| 9,902,116 B2 | 2/2018 | Godon et al. | |

(Continued)

FOREIGN PATENT DOCUMENTS

| | | |
|---|---|---|
| DE | 19945113 A1 | 3/2001 |
| DE | 102012012930 A1 | 1/2014 |

(Continued)

OTHER PUBLICATIONS

Extended European Search Report for International Application No. 18275088.5 dated Dec. 6, 2018, 18 pages.

*Primary Examiner* — Patrick F Brinson
(74) *Attorney, Agent, or Firm* — Cantor Colburn LLP

(57) ABSTRACT

A pipe assembly comprising a composite pipe, and end connector provided at an end of the pipe, and means for providing a visual indication of impact damage to the pipe, the means for providing a visual indication of impact damage to the pipe comprising a thin sleeve mounted around, but spaced from, a pipe body of the composite pipe, whereby at each end of the pipe body, the pipe body, the sleeve and the end connector are preferably sealingly fitted together, and wherein the sleeve is configured to provide a visual indication indicative of an impact acting on the sleeve even if the impact does not reach the pipe body.

10 Claims, 4 Drawing Sheets

(56) References Cited

U.S. PATENT DOCUMENTS

| | | |
|---|---|---|
| 2009/0197031 A1 | 8/2009 | Porte et al. |
| 2010/0089521 A1* | 4/2010 | Ng .................. F16L 11/081 156/145 |
| 2010/0186845 A1* | 7/2010 | Knotten .................. F16L 33/01 138/104 |
| 2013/0160886 A1 | 6/2013 | Wright, Jr. |

FOREIGN PATENT DOCUMENTS

| | | |
|---|---|---|
| DE | 202015006737 U1 | 11/2015 |
| EP | 2963347 A1 | 1/2016 |
| JP | S61289633 A | 12/1986 |
| KR | 101186933 B1 | 9/2012 |

* cited by examiner

COMPOSITE PIPE ASSEMBLY

FOREIGN PRIORITY

This application claims priority to European Patent Application No. 18275088.5 filed Jun. 22, 2018, the entire contents of which is incorporated herein by reference.

TECHNICAL FIELD

The present disclosure relates to composite pipe assemblies, in particular, but not exclusively to pipes such as fuel pipes used in aircraft or the like and having a composite fibre structure.

BACKGROUND

Composite pipes e.g. comprising glass or carbon fibre composite materials have become common in applications where the pipes may be subjected to extreme loads and conditions such as in aircraft. Aircraft fuel pipes, for example, are often composite pipes. Such composites are strong and stiff and less liable to breakage or fracture than conventionally used heavy metals whilst also being lighter. In extreme conditions, the composite pipes need to be resistant to damage due to the mechanical and environmental conditions. Further, the structures have to be adapted to withstand misuse such as having a heavy load applied thereto or to material damage caused by impact. At the same time, manufacturers are under pressure to provide parts at lower cost and to provide lighter parts.

Safety is, of course, paramount for aircraft parts. It is vital to known when a part, such as a fuel pipe is damaged so that it can be immediately repaired and/or replaced. Damage which goes unnoticed but which could result in failure of a part, can have catastrophic consequences. The ability to promptly detect damage to the material or structure of a component, even if that damage is not immediately visible, is critically important.

Impact damage is one of the most commons forms of damage to composite fibre aircraft parts. Impact damage can occur during assembly, installation, maintenance or ordinary use. The components can themselves be dropped or heavy objects such as tools can fall on them or can collide with them. Often, after impact, no damage, or at least no significant damage, is visible at the surface of the component, but it may be that the impact has caused significant damage to the inner layers of the composite structure.

Barely visible impact damage (BVID) is damage, due to impact, that can only just be seen with the naked eye on a very close inspection. Airlines have strict requirements as to how BVID must be detected or monitored. This is usually achieved by providing additional layers of composite fibres in the component. This, however, adds considerably to the size, weight and cost of the component. DE 20 2015 006 737 describes providing a coating on a pipe to indicate damage.

FIGS. 1a and 1b show cross-sectional schematic views of conventional composite pipes such as fuel pipes. FIG. 1a is an external pipe with a pipe body 1. This is typically a single structural layer and can be provided with different finishes including textured, machined or painted. The ends of the pipe body are provided with grooves 2 to receive O-ring seals 3. End fittings 4,5 are mounted into the ends of the pipe body 1 and are sealingly held in place by the seals 3. The end fittings are usually made of metal e.g. aluminium, titanium or steel, but can also be made of composite materials.

FIG. 1b is an internal pipe which is similar in structure to the external pipe of FIG. 1a except that the fittings 4', 5' are mounted to the outside of the ends of the pipe body 1' via O-ring seals 3' mounted in grooves 2' formed in the outer surface of the pipe body. The seals may typically be made of elastomeric material or nitrile or silicone rubber.

Visual inspections are essential in all aerospace, and many other applications.

To avoid or detect impact damage, some conventional pipes comprise a pipe body with a dual or multiple layer structure but this adds to the size and weight of the pipe. In other solutions, different textures or ribs may be provided on the outer surface of the pipe body which will provide visual evidence of impact damage.

There is a need for a composite component wherein impact damage can be more easily and quickly detected without significantly adding to the size, weight or cost of the pipe.

SUMMARY

According to the present disclosure, there is provided a pipe assembly comprising a composite pipe, and end connector provided at an end of the pipe, and means for providing a visual indication of impact damage to the pipe, the means for providing a visual indication of impact damage to the pipe comprising a thin sleeve mounted around, but spaced from, a pipe body of the composite pipe, whereby at each end of the pipe body, the pipe body, the sleeve and the end connector are fitted together, and wherein the sleeve is configured to provide a visual indication indicative of an impact acting on the sleeve even if the impact does not reach the pipe body.

The sleeve may be a sleeve of thin, brittle material that exhibits visible cracks indicative of the impact. Alternatively, the sleeve may be in the form of a bellows or concertina sleeve or in the form of a transparent sleeve containing a liquid that changes e.g. colour on impact. Other sleeves configured to show an effect of impact are also envisaged.

The sleeve may be mounted around the pipe with the end connector within the sleeve or with the end connector outside the sleeve.

DETAILED DESCRIPTION

According to the present disclosure, improved impact damage detection is provided by providing a relatively thin sleeve around, but spaced from, the pipe body of a composite pipe, whereby at each end of the pipe body, the pipe body, the sleeve and an end connector are sealingly fitted together, and wherein the sleeve is configured to provide a visual indication indicative of an impact that has acted on the sleeve even if the impact did not reach the pipe body.

The relatively thin sleeve is fitted around the pipe body, at a distance therefrom, so that it immediately shows the effect of an impact against the sleeve.

The sleeve can take different forms and can provide the visual indication of the impact in different ways, but in all embodiments, the thickness of the sleeve should be less that the additional thickness that would be required for a conventional multi-layered pipe and there should be a space or gap between the impact-taking sleeve and the pipe body, e.g. 50 mm OD, 2 mm wall, 5 mm gap (to allow deflection). This allows the outer sleeve to be damaged by the impact and to show that damage before the inner pipe is affected by the impact. The gap can also provide some protection to the inner pipe.

Figure 1A:
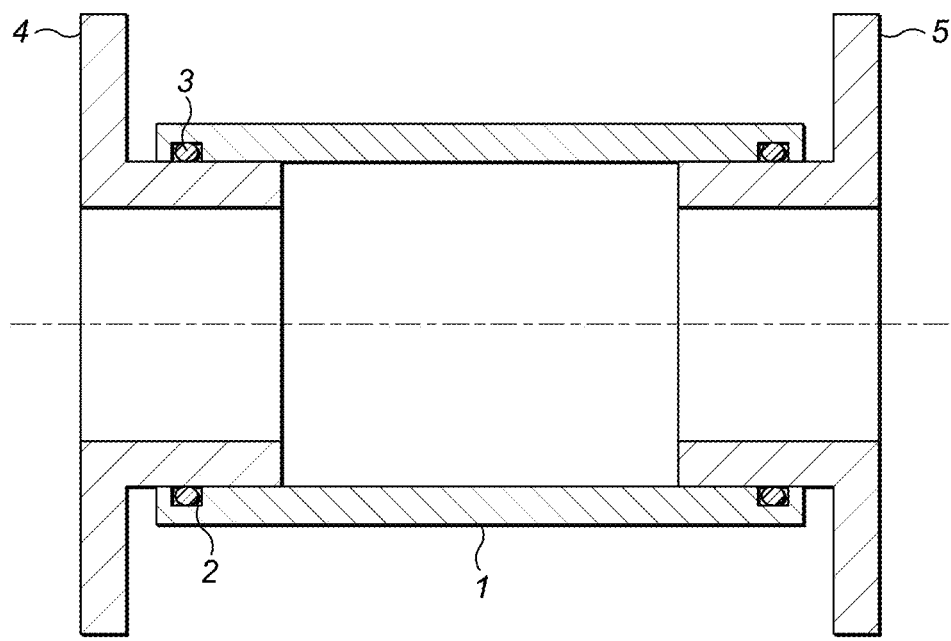
FIG. 1a is a schematic cross-sectional view of a conventional pipe with internally fitted end connectors.
Figure 1B:
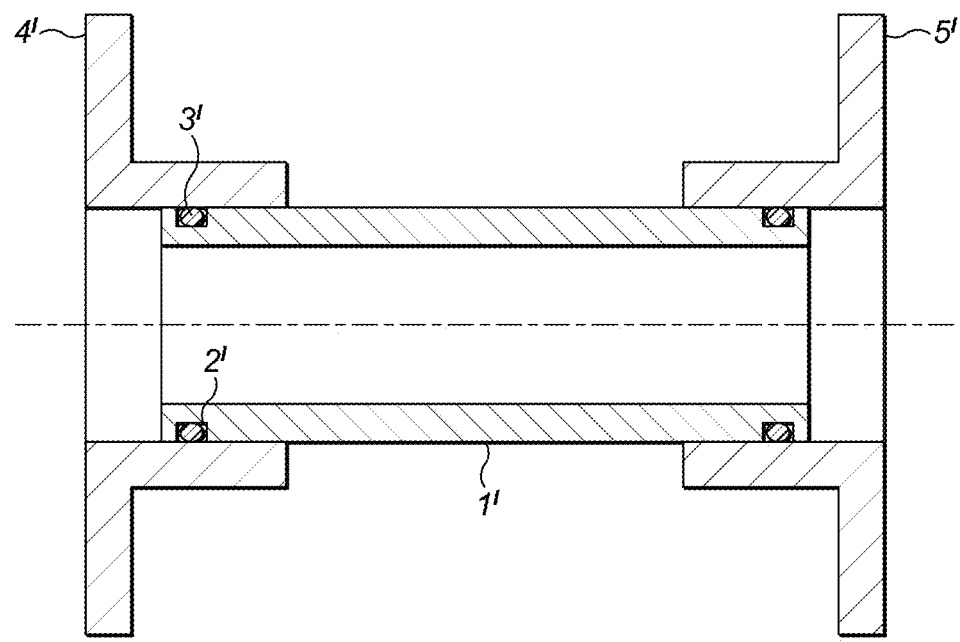
FIG. 1b is a schematic cross-sectional view of a conventional pipe with externally fitted end connectors.

The sleeve can be applied to pipes where the end fittings are internal to the pipe body (as in FIG. 1a) or external (as in FIG. 1b).

This disclosure concerns providing an indication of impact damage to a composite tube or pipe. Such pipes are known in many fields and these are generally glass fibre or carbon fibre composite pipes (or combinations thereof). The outer body is usually a conductive carbon-rich gel coat to optimise electrical flow to ground/earth.

An impact indicating sleeve is provided on the tube, according to the disclosure, as described further below.

Figure 2:
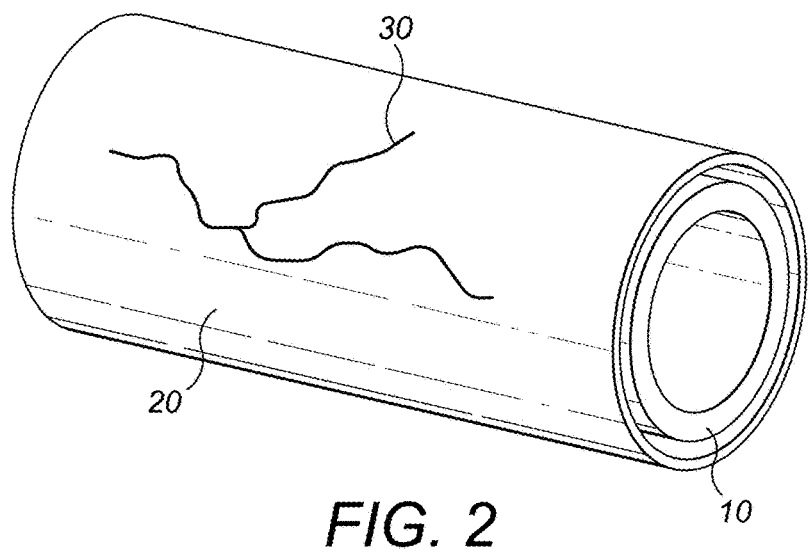
FIG. 2 is a perspective view of a pipe assembly according to the disclosure.

FIG. 2 shows a perspective view of an example of the pipe assembly where the sleeve is a thin brittle sleeve 20 about the pipe body 10. In the event of an impact against the pipe, it would first cause the brittle outer sleeve to visibly crack 30 over a large part of its surface, even before the impact has damaged the inner pipe body. The crack 30 provides a clear indication that the pipe assembly should be further inspected for damage and/or removed and replaced or repaired.

In addition to providing an immediate visual indication that impact has occurred (which might have damaged the interior layers of the composite pipe), the sleeve, spaced from the pipe, takes the impact first, before the pipe, potentially providing a protective function.

Various ways of implementing the sleeve are shown in FIGS. 3 to 10. These are examples only and are not limiting to the scope of the disclosure. All of the examples can be adapted to internal or external pipes.

Figure 3:
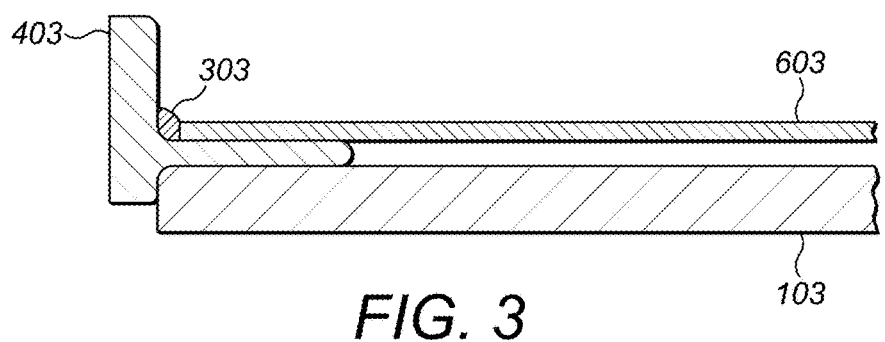
FIGS. 3 to 10 are partial cross sectional views of an end of different embodiments of pipes according to the disclosure.

FIG. 3 shows the pipe body 103 to which an end fitting 403 is mounted, similar to the conventional fitting of FIG. 1b. A thin, brittle BVID layer 603 is mounted around the pipe body and sealed e.g. by elastomeric supports 303 to the pipe body and the end connector at the ends (only one end is shown). As shown in FIG. 2, if an impact acts on the pipe, it will impact the sleeve 603 first. This is made of a thin brittle material e.g. Polystyrene, polymethyl methacrylate (Acrylic) or another polymer, selected to crack in a large spread out crack 30 on impact that can quickly and easily be seen and even before the impact affects the pipe body 103.

Figure 4:
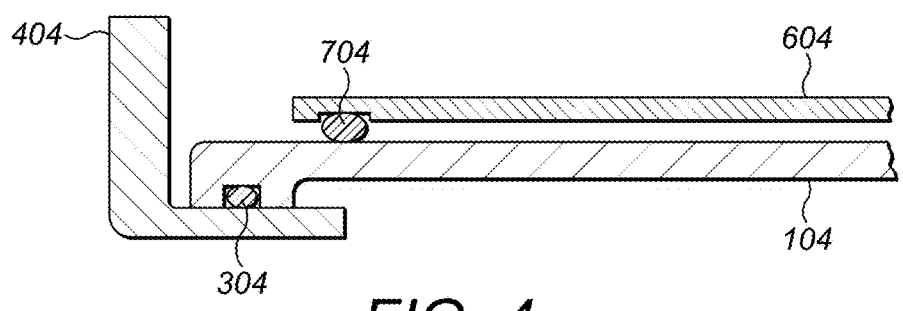

FIG. 4 is similar to FIG. 3, but the pipe body 104 is external to the fitting 404 (similar to FIG. 1a). At the end, the pipe body is sealed with the end fitting by a sealant 304. The sleeve of thin brittle material 604 is sealed to the pipe body by another seal 704.

Figure 5:
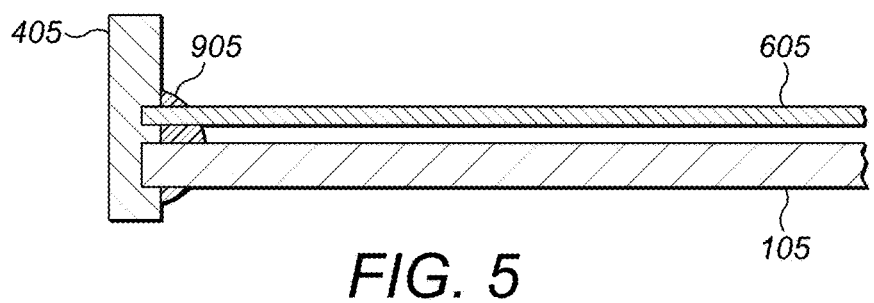
Figure 6:
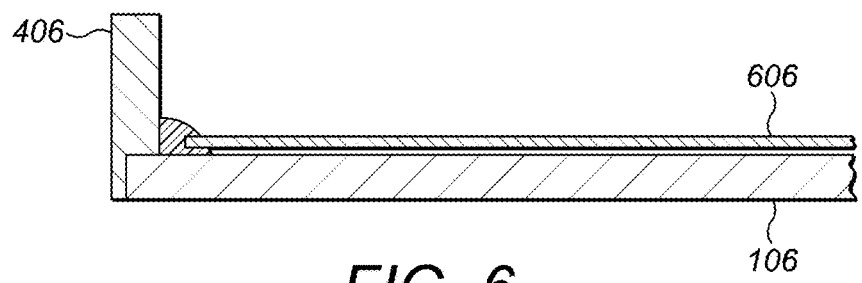

FIG. 5 is similar to FIG. 3 and FIG. 4 except here the end fitting 405 does not extend into or around the pipe body 105. Instead the pipe body 105 and sleeve 605 are secured to the end fitting by a seal 905.

FIG. 6 is again a similar embodiment except that the way the end fitting 406 is sealed to the pipe body 106 and sleeve 606 is different, as shown.

Figure 7:
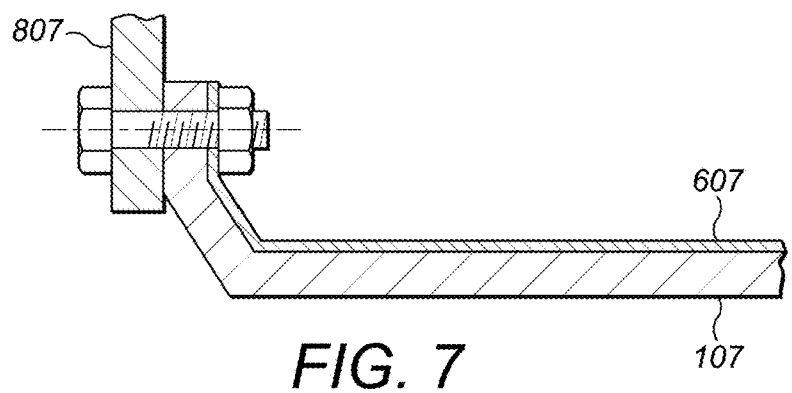

In FIG. 7, the end fitting is in the form of a mount or connector 807 for attachment to another component and the pipe body 107 and sleeve 607 are attached mechanically. The sleeve and the pipe body could be attached in various ways e.g. by adhesive, by a bonded seal, by interference fit etc.

Figure 8A:
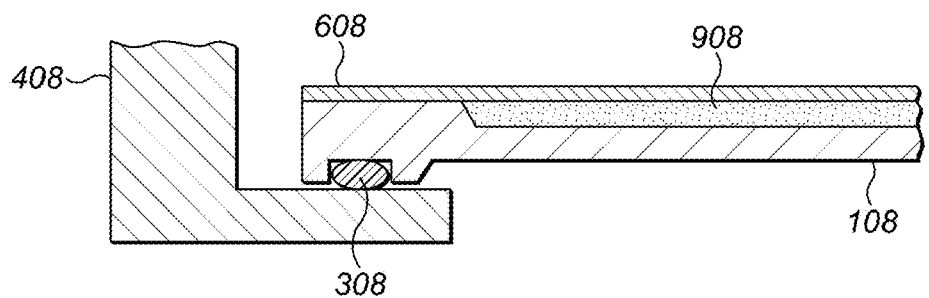
Figure 8B:
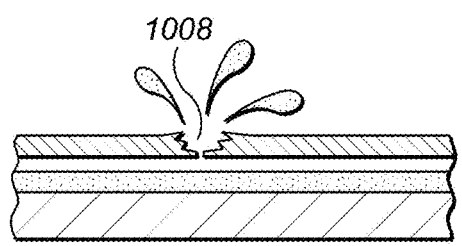

FIGS. 8a and 8b show a different means for providing a visual indication of the impact—here the sleeve is a transparent sleeve 608 around the pipe body 108 and a liquid is provided in the gap between the pipe body and the sleeve. The liquid 908 is selected to be a liquid that changes some characteristic on application of force or impact for example changes colour. When the sleeve 608 experiences an impact, this is transferred to the liquid 908 causing it to change colour, which can be seen through the transparent sleeve 608, or, the change in fluid characteristic can be that it expands or changes temperature and this may cause the sleeve to break (FIG. 8b, 1008). An alternative (not shown) is to use pressure sensitive or pH sensitive paper that changes colour on impact.

Figure 9A:
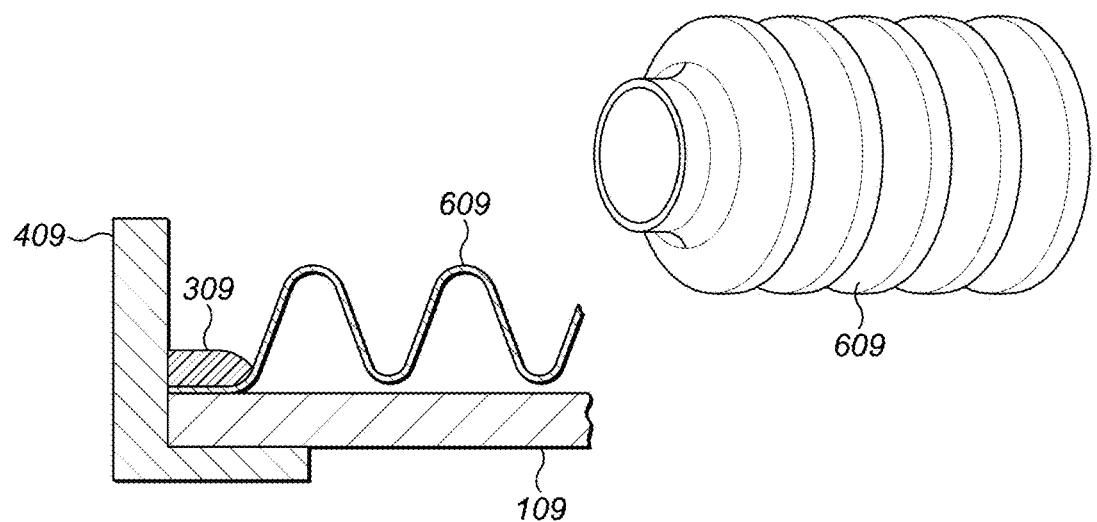

In the embodiment of FIG. 9A, the sleeve has a folded, concertina or bellows form 609 around the pipe body 109 and this distorts on impact.

Figure 9B:
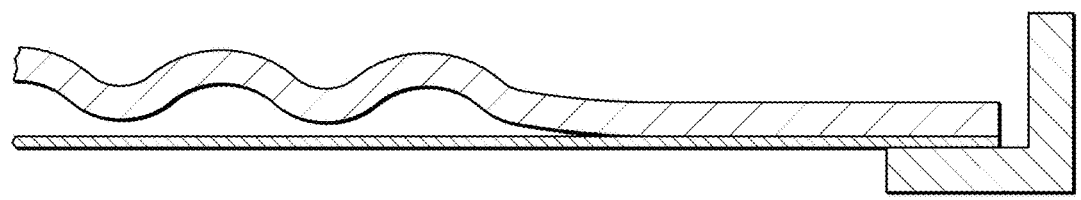

In FIG. 9B, the sleeve is in the form of a "partial" bellows 609'. Fuel leakage from the inner tube would be visible, e.g. air bubbles.

Figure 10:
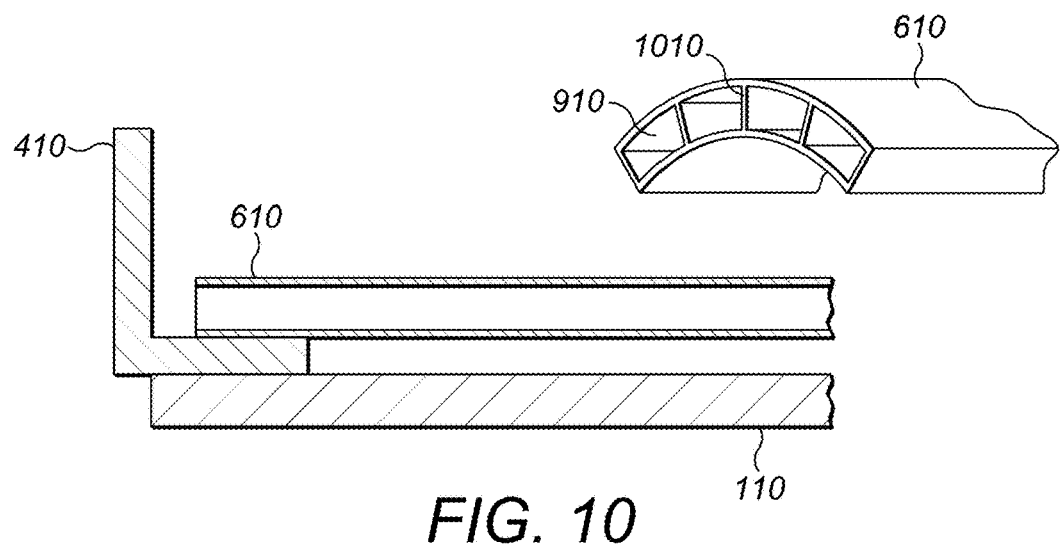

In the embodiment of FIG. 10 the sleeve 610 is in the form of a double walled sleeve defining cavities 910 separated by thin walls 1010. On impact, the sleeve deforms and the cavities deform. Deformation from a regular shape is an indication of impact. A slight deformation might be indicated by e.g. a white 'stretch mark' in the sleeve material.

The end fittings for all embodiments can be readily available fittings or can be easily adapted to receive both the pipe body and the sleeve.

The light, thin, brittle sleeve or sleeve whose visible characteristics change on impact allows for improved, more reliable BVID inspection and weight saving compared to conventional techniques, as well as reduced material costs.

Whilst described in relation to aircraft components such as fuel pipes, there are other composite components for which BVID can be monitored using the assembly of the disclosure.

The invention claimed is:

1. A pipe assembly comprising a composite pipe, and end fitting provided at an end of the pipe, and means for providing a visual indication of impact damage to the pipe, the means for providing a visual indication of impact damage to the pipe comprising a thin sleeve mounted around, but spaced from, a pipe body of the composite pipe, whereby at each end of the pipe body, the pipe body, the sleeve and the end fitting are fitted together, and wherein the sleeve is configured to provide a visual indication indicative that an impact has acted on the sleeve even if the impact did not reach the pipe body;

wherein the sleeve includes a paper liner between the pipe and an outer sleeve.

2. The pipe assembly of claim 1, wherein the paper liner is pressure sensitive and changes colour on impact.

3. The pipe assembly of claim 2, wherein the paper liner changes colour when exposed to air to indicate leakage from or damage to the pipe.

4. The pipe assembly of claim 1, wherein the paper liner changes colour when exposed to air to indicate leakage from or damage to the pipe.

5. A pipe assembly comprising a composite pipe, and end fitting provided at an end of the pipe, and means for providing a visual indication of impact damage to the pipe, the means for providing a visual indication of impact damage to the pipe comprising a thin sleeve mounted around, but spaced from, a pipe body of the composite pipe, whereby at each end of the pipe body, the pipe body, the sleeve and the end fitting are fitted together, and wherein the sleeve is configured to provide a visual indication indicative that an impact has acted on the sleeve even if the impact did not reach the pipe body;

wherein the sleeve is a double-walled sleeve.

6. The pipe assembly of claim 1, wherein the sleeve is mounted around the pipe with the end fitting within the sleeve.

7. The pipe assembly of claim 2, wherein the sleeve is mounted around the pipe with the end fitting within the sleeve.

8. The pipe assembly of claim 3, wherein the sleeve is mounted around the pipe with the end fitting within the sleeve.

9. The pipe assembly of claim 4, wherein the sleeve is mounted around the pipe with the end fitting within the sleeve.

10. The pipe assembly of claim 5, wherein the sleeve is mounted around the pipe with the end fitting within the sleeve.

* * * * *